United States Patent [19]

Ikuta

[11] Patent Number: 4,977,464
[45] Date of Patent: Dec. 11, 1990

[54] METHOD OF PRODUCING HALFTONE IMAGES BY CHOOSING A CONVERSION FUNCTION BASED ON VIRTUAL AND REFERENCE SOLID PIXELS

[75] Inventor: Kunio Ikuta, Kyoto, Japan

[73] Assignee: Dainippon Screen Mfg. Co., Ltd., Kyoto, Japan

[21] Appl. No.: 432,818

[22] Filed: Nov. 7, 1989

[30] Foreign Application Priority Data

Nov. 17, 1988 [JP] Japan ................... 63-292174

[51] Int. Cl.$^5$ ............................. H04N 1/40
[52] U.S. Cl. ................. 358/448; 358/455; 358/456; 358/457; 358/458; 358/461; 358/466
[58] Field of Search .......... 358/443, 448, 447, 452, 358/454, 455, 456, 457, 458, 459, 461, 463, 465, 466

[56] References Cited

U.S. PATENT DOCUMENTS

| | | | |
|---|---|---|---|
| 4,547,811 | 10/1985 | Ochi et al. | 358/466 |
| 4,549,220 | 10/1985 | Suzuki | 358/457 |
| 4,698,778 | 10/1987 | Ito et al. | 358/457 |

FOREIGN PATENT DOCUMENTS

| | | |
|---|---|---|
| 55-6393 | 1/1980 | Japan . |
| 63-288370 | 5/1987 | Japan . |
| 63-16945 | 4/1988 | Japan . |

OTHER PUBLICATIONS

Yoshiharu Morimoto et al., "Screening and Moire-Suppressing in Printing", Proceedings of 18th Jt. Conf. on Image Technology, Japan Society of Applied Physics. Inst. of Tele. Engs. of Japan, pp. 271-274.

Primary Examiner—Edward L. Coles, Sr.
Assistant Examiner—Jerome Grant, II
Attorney, Agent, or Firm—Lowe, Price, LeBlanc, Becker & Shur

[57] ABSTRACT

An image signal (PS) or a screen threshold value (D) is converted by a plurality of conversion functions ($F_i$, $G_i$, $f_i$, $g_i$). The number ($N_{ST}$) of reference solid pixels, which should be exposed to attain a halftone area rate specified by a given image signal, is calculated for each quarter block (QB) which is a quarter of one unit block for one halftone dot. The numbers ($N_{RS}$) of virtual solid pixels, which would be exposed if the converted image signal or the converted screen threshold value were used, are calculated concerning respective conversion functions for each quarter block. The number ($N_{RS}$) of virtual solid pixels which is the closest to the number ($N_{ST}$) of reference solid pixels is selected and the conversion function corresponding to the selected number ($N_{RS}$) is also selected for each quarter block (QB). Photosensitive film is exposed on the basis of the converted image signal or the converted screen threshold value converted by the selected conversion function, whereby the halftone area rate specified by the given image signal is attained, and the line portion is prevented to be seen broken.

16 Claims, 17 Drawing Sheets

METHOD OF PRODUCING HALFTONE IMAGES BY CHOOSING A CONVERSION FUNCTION BASED ON VIRTUAL AND REFERENCE SOLID PIXELS

BACKGROUND OF THE INVENTION

1. Field of the Invention

The present invention relates to a method of and an apparatus for producing a halftone image with an image scanner.

2. Description of the Prior Art

A method of producing a halftone image is disclosed in, for example, Japanese Patent Laying Open Gazette No. 55-6393. A halftone image formed by such a method, however, has a deformed contour and/or a broken line portion. In addition, if the halftone image includes a repetitional pattern, moiré may occur due to interference between the repetitional pattern and an array of halftone dots.

As a method to suppress the moiré, Japanese Patent Publication Gazette No. 63-16945, for example, discloses a method of previously preparing a plurality of density distribution patterns for originals and a plurality of screen threshold patterns, dividing an unit block of a halftone dot into partial areas, selecting one of the density distribution patterns proper to each partial area, and selecting the screen threshold pattern corresponding to the selected density distribution pattern.

However, in order to obtain an halftone image of high quality by the method disclosed in Japanese Patent Publication Gazette No. 63-16945, the number of screen threshold patterns to be previously prepared must be increased depending on both of the number of partial areas and the number of gradation levels in each partial area. For example, when the number of partial areas is six and the number of gradation levels in each partial area is 16, the number of screen threshold patterns to be prepared is $16^6$, sixteen to the sixth power. This means that the method requires a memory having enormous capacity of storing that number of screen threshold patterns. Accordingly, it is difficult to obtain a halftone image of high quality by this method in terms of memory capacity.

In general, the smaller the number of screen threshold patterns becomes, the larger the difference between the screen threshold patterns becomes. Since the screen patterns represents shapes of halftone dots in a reproduced image, if the number of the screen threshold patterns is reduced, the shapes of halftone dots change considerably in response to the change of the density level in an original image; this causes graininess noise in the reproduced image.

SUMMARY OF THE INVENTION

The present invention is directed to a method of and apparatus for producing a halftone image, comprising the steps of: (a) preparing image data representing an original image for each pixel, (b) preparing first screen pattern data specifying a set of first threshold values for the image data, the first threshold values being assigned to respective pixels in a unit pixel block of a prescribed size, (c) preparing a plurality of conversion functions usable to convert the image data to change gradation of the image data, (d) assigning unit pixel blocks over the original image, and dividing each of the unit pixel blocks into a plurality of partial blocks, (e) computing a reference number of reference solid pixels for each partial block, the reference solid pixels being to be solid in order to attain a halftone-dot area rate specified by the image data for each partial block, (f) converting the image data by the plurality of conversion functions to produce a plurality of virtual image data, respectively, (g) comparing each of the plurality of virtual image data with the first screen pattern data for each pixel in each partial block to judge whether or not each pixel is to be solid, thereby computing a virtual number of pixels to be solid for each partial block with respect to each of the plurality of virtual image data, (h) comparing the reference number with said virtual number corresponding to each of the plurality of virtual image data, thereby selecting one of the plurality of virtual image data whose virtual number is closest to the reference number, for each partial block, (i) selecting one of the plurality of conversion functions by which selected virtual image data are obtained, for each partial block, (j) converting the image data into converted image data by a selected conversion function with respect to each partial block, and (k) producing a halftone image as a function of the converted image data and the first screen pattern data.

Preferably, the reference number is so defined that a ratio of the reference number to a total number of pixels in one partial block is proportional to an average of the image data in a corresponding partial block.

The step (e) may comprise the steps of: (e-1) preparing second screen pattern data specifying a set of second threshold values for the image data in one partial block, the second threshold values being so formed that the partial block is divided into a plurality of subblocks in each of which the second threshold values are arranged from the center to the periphery in order, (e-2) comparing the image data with the second screen pattern data for each pixel in each partial block to judge whether or not each pixel is to be solid, and (e-3) defining the reference number to be the number of pixels judged to be solid in each partial block at the step (e-2).

Further, the plurality of conversion functions may be linear functions having a variable corresponding to the image data, and a coefficient of the variable may be no less than one.

According to an aspect of the present invention, the first screen pattern data may be converted instead of the image data by a plurality of conversion functions to change gradation of the first threshold values. In this case, the plurality of conversion functions may be linear functions having a variable corresponding to the first screen pattern data, and a coefficient of the variable may be no more than one.

Accordingly, an object of the present invention is to provide a method of and an apparatus for producing a halftone image in which a contour and a line portion are stably reproduced to be seen continously and without being broken with a simple apparatus without causing graininess noise and the moiré.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
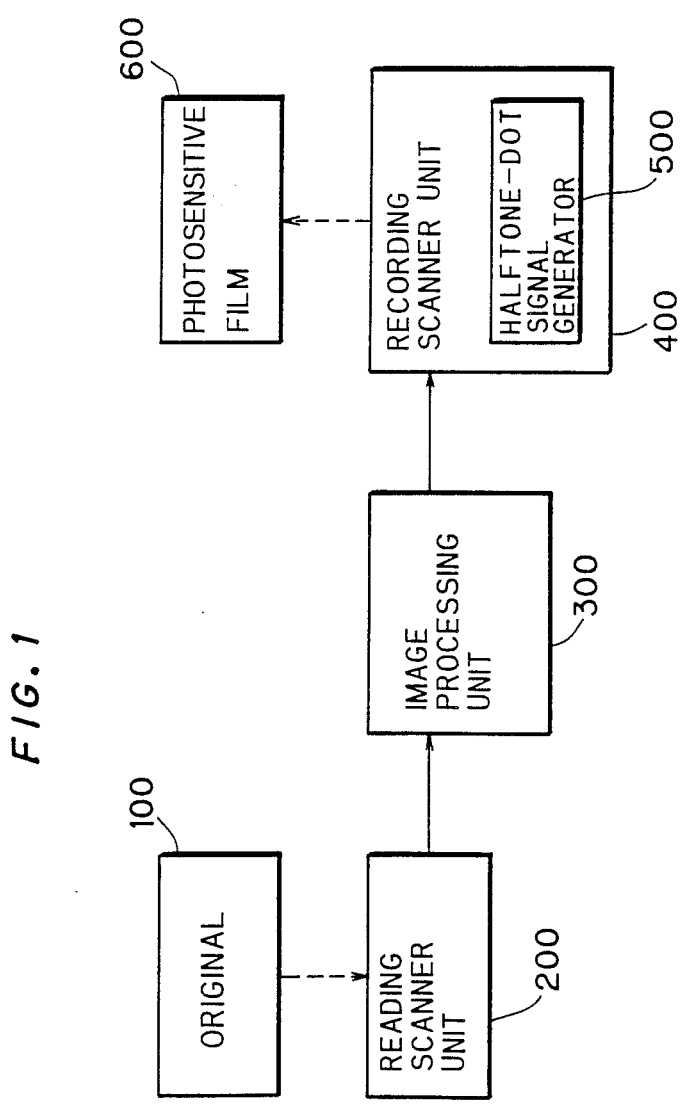
FIG. 1 is a block diagram showing the structure of a process scanner according to a preferred embodiment of the present invention.

FIG. 1 is a schematic block diagram of a process scanner according to a preferred embodiment of the present invention. In FIG. 1, an image of an original 100 is scanned and read for each pixel by a reading scanner unit 200. An image signal thus obtained is transferred to an image processing unit 300. The image processing unit 300 performs processing such as gradation setting and detail enhancement with respect to the inputted image signal. The image signal after the processing is supplied to a recording scanner unit 400. The recording scanner unit 400 has a halftone-dot signal generator 500 which will be described later. The recording scanner unit 400 preforms processing, which will be also described later, with respect to either of the image signal and a screen threshold pattern and converts the image signal into a halftone dot signal. The recording scanner unit 400 records a halftone image by exposing a photosensitive film (a surface-to-be-scanned) 600 in response to the halftone signal.

Figure 2:
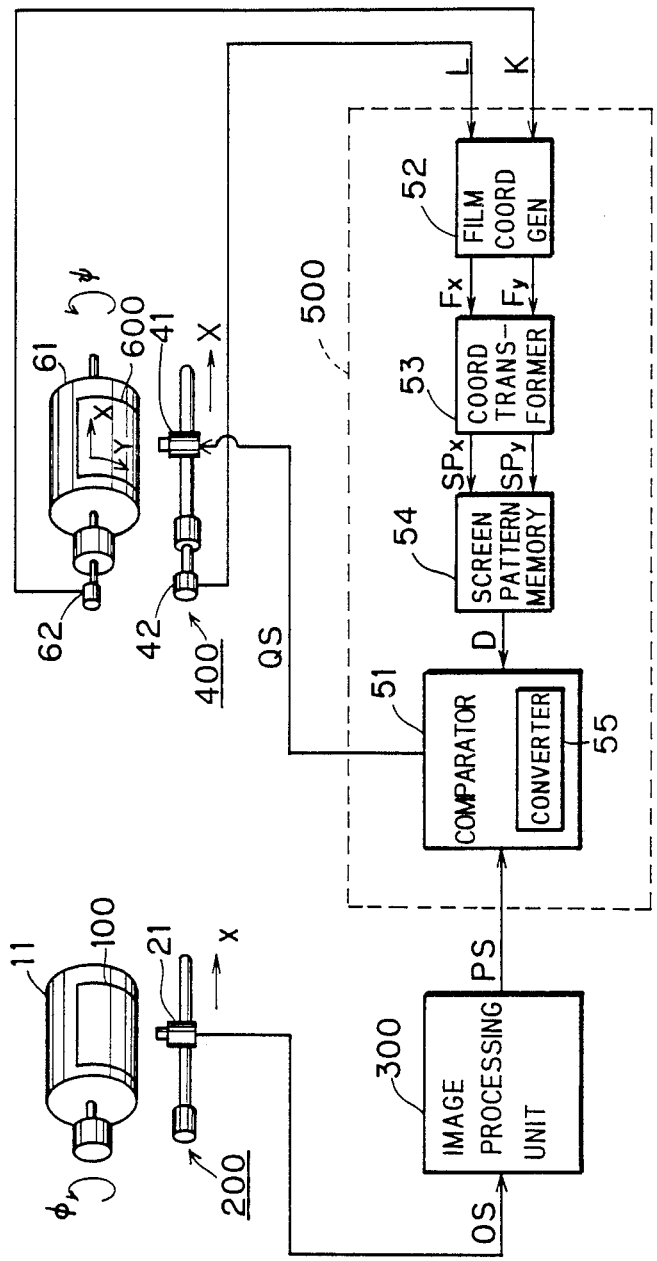
FIG. 2 is a schematic block diagram of the process scanner.

FIG. 2 is a diagram showing detailed structure of blocks shown in FIG. 1. A pick-up head 21 scans an original 100 mounted on an original drum 11 rotating in the direction $\phi$ for each scanning line while moving in the x direction, to obtain an image signal OS. The image signal OS is subjected to predetermined processing such as color correction and gradation correction in the image processing unit 300, to be converted into a processed image signal PS.

The processed image signal PS is supplied to a comparator 51 in the halftone-dot signal generator 500, and converted therein into an exposure control signal QS. A recording head 41 modulates an exposure beam in response to the exposure control signal QS while moving in the X direction and exposes the photosensitive film 600 mounted on a recording drum 61 rotating in a direction $\psi$.

The conversion processing in the halftone-dot signal generator 500 will be described below.

A rotary encoder 62 connected to the recording drum 61 outputs a position signal K concerning a main scanning direction Y, and a rotary encoder 42 connected to a feed screw for moving the recording head 41 outputs a position signal L concerning a subscanning direction X. The main scanning direction Y on the photosensitive film 600 corresponds to a circumferential direction of the recording drum 61, and the subscanning direction X corresponds to the axis of rotation.

The position signals K and L are inputted to a film coordinate generator 52 in the halftone-dot signal generator 500 and converted therein into film coordinates $(F_x, F_y)$ indicating the position of a pixel subjected to exposure on the photosensitive film 600. The film coordinates $(F_x, F_y)$ are inputted to a coordinate transformer 53, and converted therein into pattern coordinates $(SP_x, SP_y)$ by coordinate transformation operation described later. The screen pattern coordinates $(SP_x, SP_y)$ serve as address signals in accessing a screen pattern memory 54. In response to the screen pattern coordinates, a screen threshold value D is read out from the screen pattern memory 54 and supplied to the comparater 51. A converter 55 provided in the comparator 51 performs conversion of either the screen threshold value D or the processed image signal PS, as will be described later. Thereafter, the comparator 51 compares the screen threshold value D with the processed image signal PS, to generate the exposure control signal QS as described above according to the result of comparison.

Figure 3A:
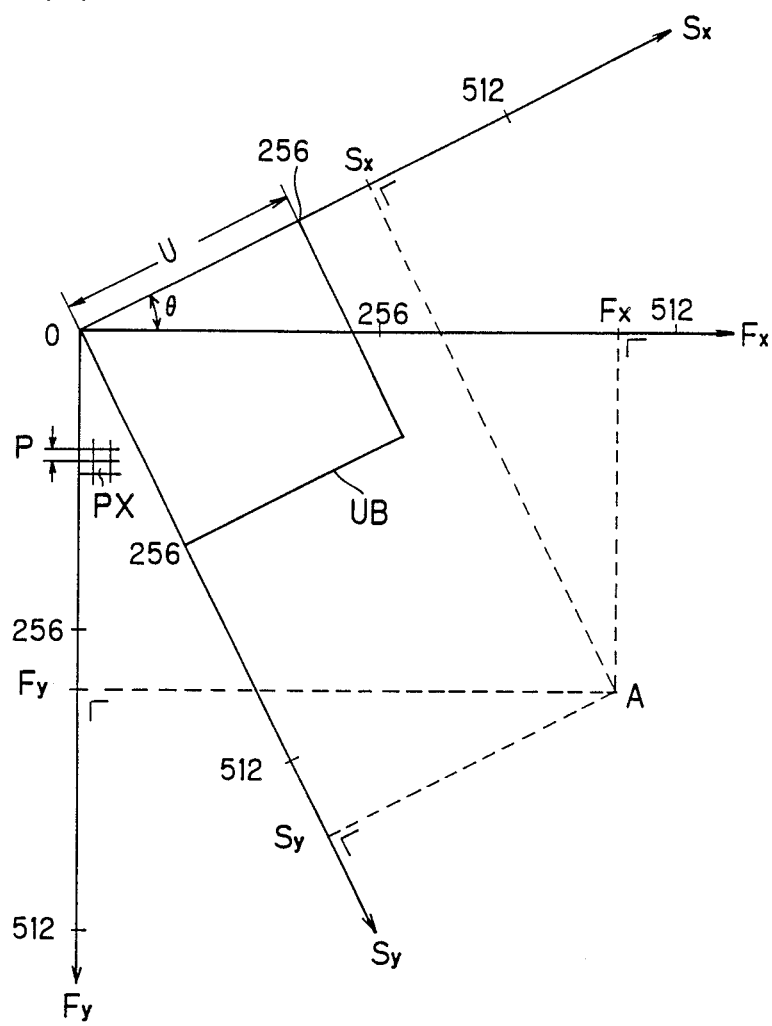
FIGS. 3A through 3C are diagrams showing a method of coordinate transformation.
Figure 3B:
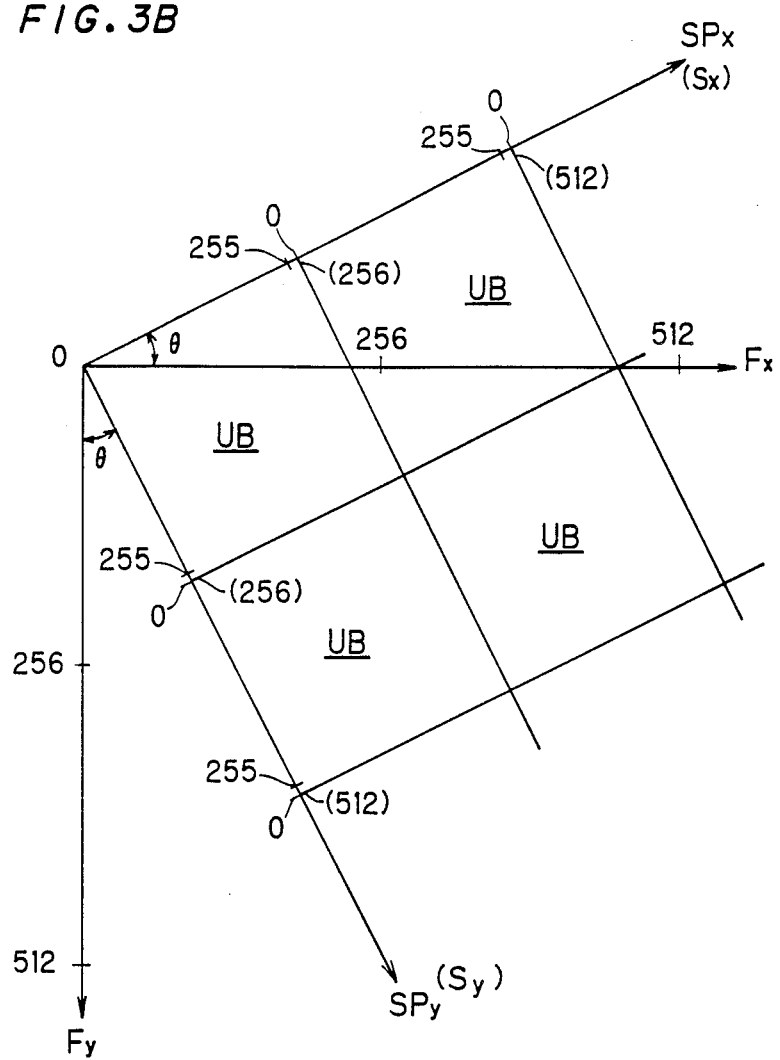
Figure 3C:
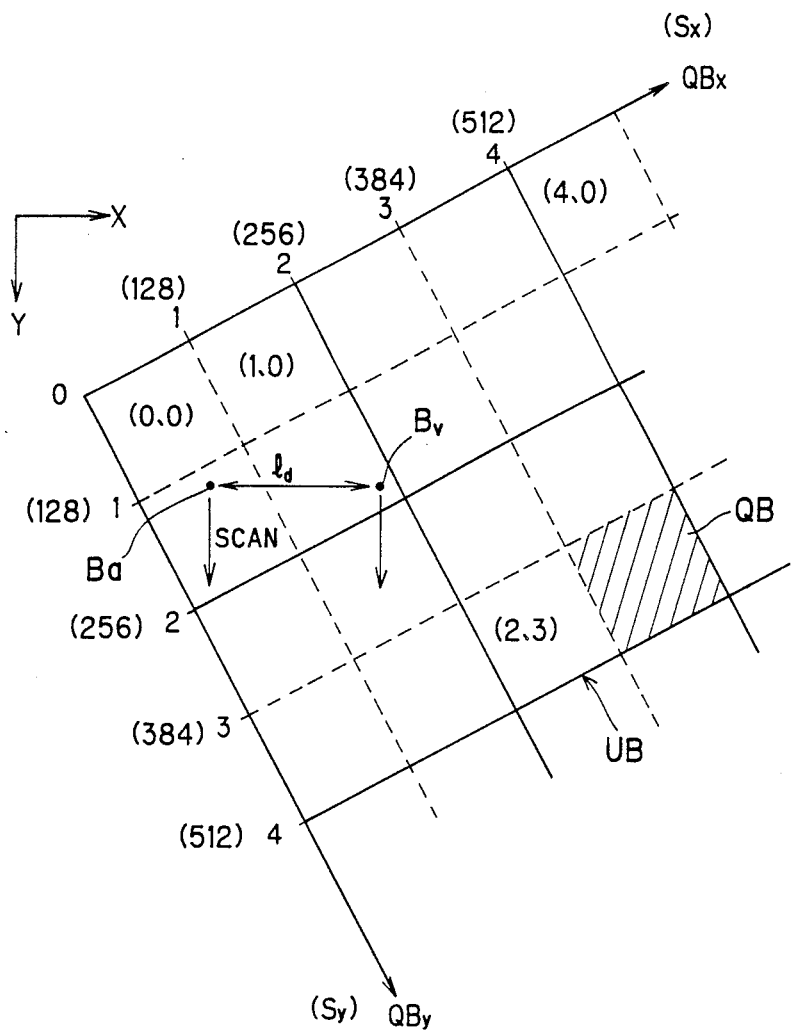

The coordinate transformation operation in the halftone-dot signal generator 500 is preforms as follows. FIGS. 3A through 3C schematically illustrate the coordinate transformation operation. The film coordinate generator 52 converts the positional signals K and L into the film coordinates $(F_x, F_y)$. The film coordinates $(F_x, F_y)$ has a unit scale corresponding to a length P of one side of an exposure pixel PX having a square shape, as shown in FIG. 3A.

Transformation from the film coordinates $(F_x, F_y)$ to the screen pattern coordinates $(SP_x, SP_y)$ in the coordinate transformer 53 may be accompanied with rotation of the coordinate axes as described below. This rotation of the coordinate axes is required when plural halfone images, such as color separation images, are produces and respective screen angles for the plural halftone images are set different from each other to prevent the moiré. FIGS. 3A through 3C show how a series of coordinate transformation operations is achieved.

In FIG. 3A, the film coordinates $F_x, F_y$ are transformed to screen coordinates $(S_x, S_y)$. The film coordinates $(F_x, F_y)$ and the screen coordinates $(S_x, S_y)$ have a common origin and are inclined at an angle $\theta$ from each other.

The screen coordinates $(S_x, S_y)$ has a unit block UB whose side has a length U of 256 (equals two to the eigth power) unit scales. This unit block UB corresponds to a full area of one halftone dot at the time of exposure.

Transformation from the film coordinates $(F_x, F_y)$ to the screen coordinates $(S_x, S_y)$ is achieved by rotating the axes of the film coordinate $(F_x, F_y)$ by the angle $\theta$ and contracting or magnifying the axes, which is given by the following equations (1a) and (1b) as well known in the art:

$$S_x = (F_x \cos\theta - F_y \sin\theta) \times (P \times U/256) \quad (1a)$$

$$S_y = (F_x \sin\theta - F_y \cos\theta) \times (P \times U/256) \quad (1b)$$

In addition, letting $\alpha = \cos\theta \times (P \times U/256)$ and $\beta = \sin\theta \times (P \times U/256)$, the following equations (2a) and (2b) are obtained:

$$S_x = F_x \cdot \alpha - F_y \cdot \beta \quad (2a)$$

$$S_y = F_x \cdot \beta + F_y \cdot \alpha \quad (2b)$$

As shown in FIG. 3B, the screen coordinates ($S_x$, $S_y$) are then transformed to the screen pattern coordinates ($SP_x$, $SP_y$). The screen pattern coordinates ($SP_x$, $SP_y$) are particular coordinates defined within each unit block UB. In other words, the screen pattern coordinates $SP_x$ and $SP_y$ are defined to have a repreated coordinate range from 0 to 256 on the screen coordinates $S_x$ and $S_y$, respectively. When the remainder obtained by dividing A by B is expressed by (A·mod B), the screen pattern coordinates ($SP_x$, $SP_y$) are expressed by the following equations (3a) and (3b):

$$SP_x = S_x \cdot \text{mod } 256 \quad (3a)$$

$$SP_y = S_y \cdot \text{mod } 256 \quad (3b)$$

Furthermore, as shown in FIG. 3C, quarter blocks QB whose size is one-fourth that of the unit block UB are formed. The quarter block QB is obtained by dividing the unit block UB into four squares congruent with each other.

The coordinates $S_x$ and $S_y$ are expressed by digital data in binary system. Therefore, coordinates ($QB_x$, $QB_y$) of a quarter block QB are obtained by disregarding the least significant seven bits of the screen coordinates ($S_x$, $S_y$), which express 128 unit scales, and by decimalizing the more significant bits which are the eighth bit and more.

Figure 4A:
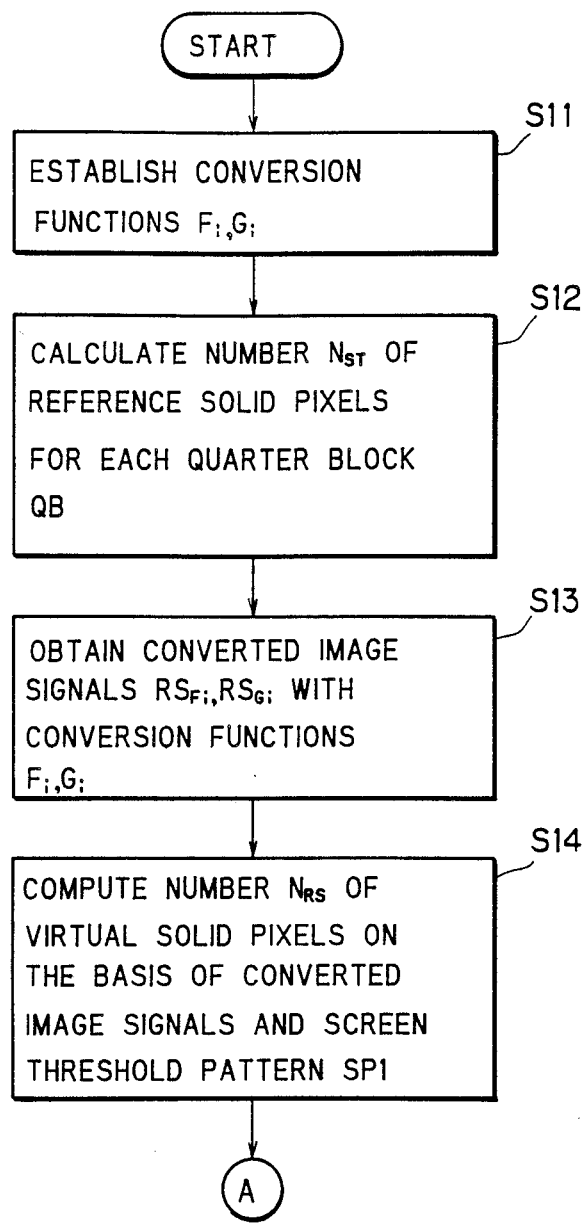
FIGS. 4A and 4B are flow charts showing the procedure of a preferred embodiment of the present invention.
Figure 4B:
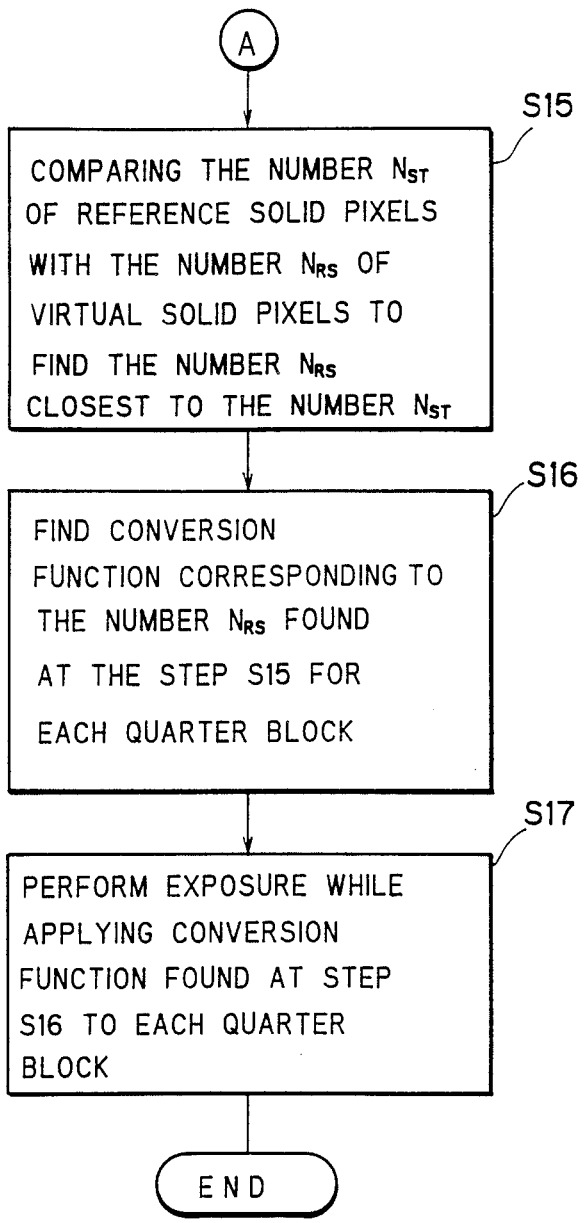

The processing in the converter 55 will be described below. FIGS. 4A and 4B are flow charts showing the procedure for converting a processed image signal PS into a converted image signal RS and exposing the photosensitive film 600.

Figure 5:
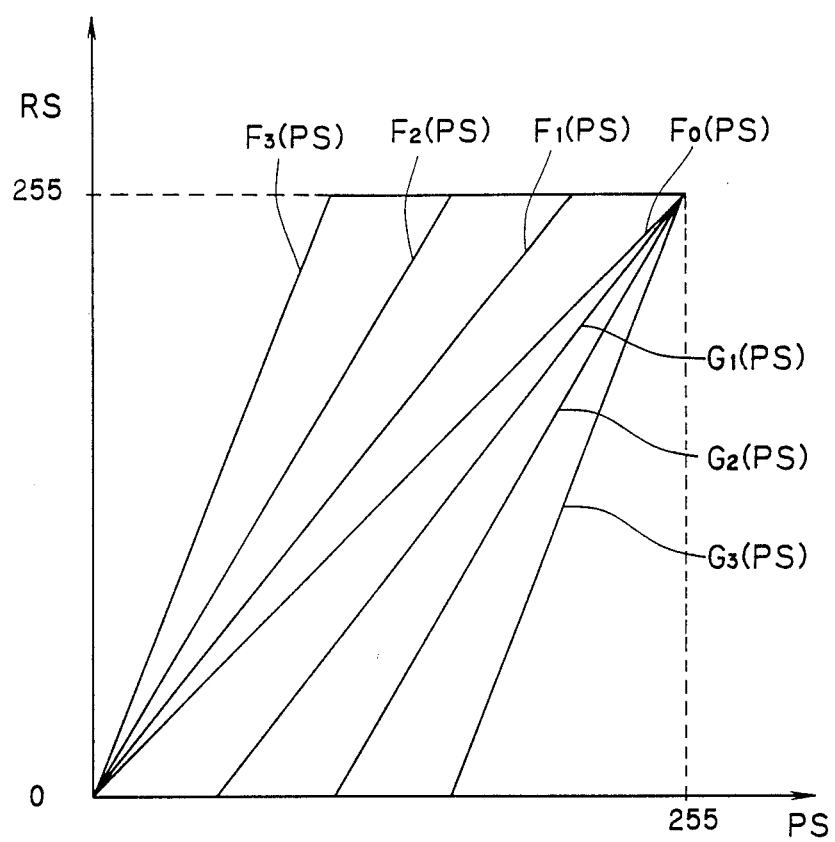
FIG. 5 is a graph showing conversion functions according to a preferred embodiment of the present invention.

At the step S11, which is a preparation step, conversion functions $F_i$ and $G_i$ ($i=0$ to 3) are established which convert the processed image signal PS (see FIG. 2) into a converted image signal RS according to the following equations, and which are shown in a graph of FIG. 5:

$$\begin{aligned}
RS &= F_0 (PS) = k^0 \times PS \\
RS &= F_1 (PS) = k^1 \times PS \\
RS &= F_2 (PS) = k^2 \times PS \\
RS &= F_3 (PS) = k^3 \times PS \\
RS &= G_1 (PS) \\
&= k^1 \times (PS - 255) + 255 \\
RS &= G_2 (PS) \\
&= k^2 \times (PS - 255) + 255 \\
RS &= G_3 (PS) \\
&= k^3 \times (PS - 255) + 255
\end{aligned}$$

where k is a constant and $k^i$ means k to the i-th power ($i=0$ to 3). The constant k is set larger than 1.0 so that tone gradation of the image under processing is increased.

Meanwhile, a conversion function of higher order which includes a constant $k^4$ or more may be used.

A halftone-dot area rate in an image is increased when the function $F_i$ ($i=1$ to 3) is used while it is decreased when the function $G_i$ ($i=1$ to 3) is used. The function $F_0$ means that no conversion is performed because k to the zero is equal to one. The functions are defined in the ranges: $0 \leq PS \leq 255$ and $0 \leq RS \leq 255$.

At the next step S12, the number $N_{ST}$ of reference solid pixels in each quarter block QB is calculated. The number $N_{ST}$ of reference solid pixels denotes a number of pixels which corresponds to a halftone area rate specified by an average value of the processed image signal PS within a quarter block QB.

Figure 6:
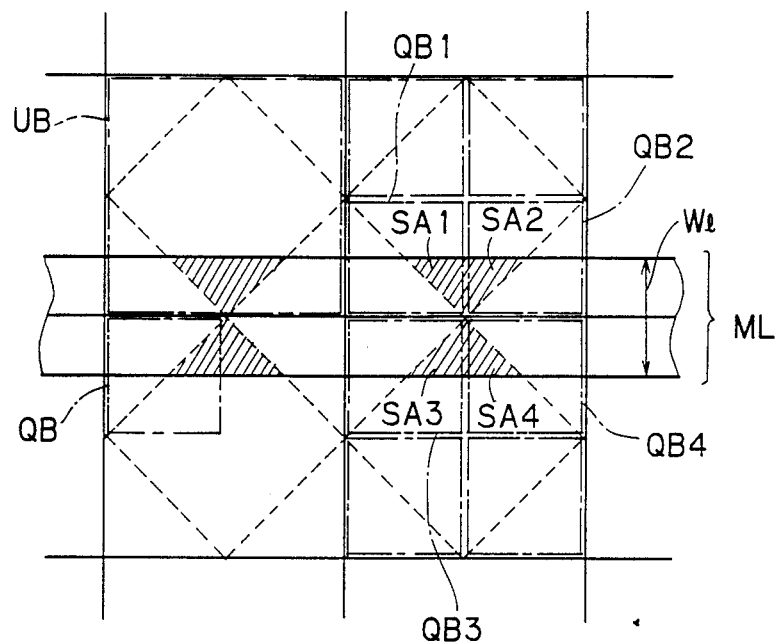
FIG. 6 is a diagram showing an ordinary screen threshold pattern.

FIG. 6 illustrates a line ML having a width $W_l$ reproduced as a halftone image. Shaded areas SA1-SA4 in FIG. 6 indicate halftone dots depicting the line ML. In other words, only a part of the line ML is exposed to form halftone dots. The processed image signal PS of the line ML represents a halftone dot area rate of 50%. Therefore, the line ML is supposed to have the halftone area rate of 50%, which is actually 25% as can be seen in FIG. 6. FIG. 6 also illustrates outlines of unit blocks UB and quarter blocks QB on which the halftone image is based.

Figure 7:
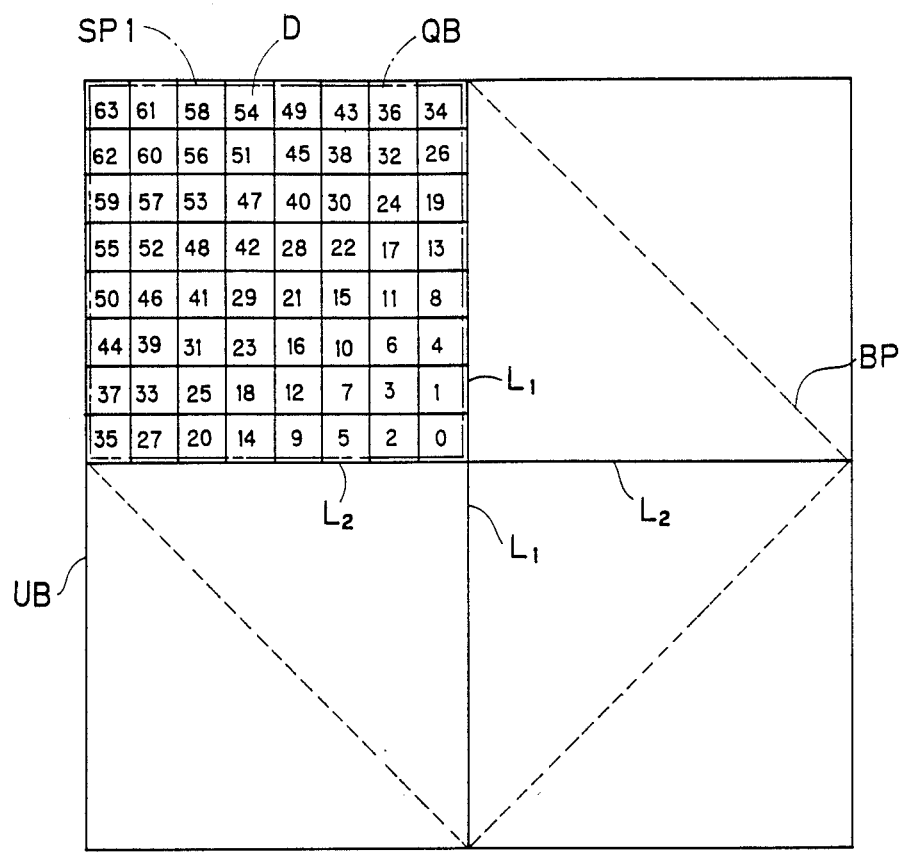
FIG. 7 is a diagram showing formation of a line on the ordinary screen threshold pattern.

FIG. 7 illustrates a screen threshold pattern for a quarter block QB in an unit block UB. The screen threshold patterns for the other three quarter blocks in the unit block UB are formed mirror-symetrically about the center lines $L_1$ and $L_2$ in the unit block UB. A screen threshold value D of the screen threshold pattern SP1 has a dynamic range from 0 to 63. The screen threshold value D of zero corresponds to a value of the processed image signal PS ranging from 0 to 3, and the screen threshold value of sixty three corresponds to a value of the signal PS ranging from 252 to 255. Consequently, a halftone dot having a halftone dot area rate of 50% covers an area whose value D is no more than 31. The outline BP of a halftone dot having the halftone dot area rate of 50% is drawn with a broken line in FIG. 7.

The line ML in FIG. 6 passes on four quarter blocks QB1-QB4, and halves of respective quarter blocks QB1-QB4 constitute the line ML. Since the processed image signal PS for the line ML represents a halftone dot area rate of 50%, each half area of the quarter blocks QB1-QB4 within the line ML is supposed to be exposed at the rate of 50%. Therefore, the quarter blocks QB1-QB4 are supposed to be exposed at the rate of 25%. Actually, however, only 25% of each half area of the quarter blocks QB1-QB4 is exposed as shown with the shaded areas SA1-SA4; that is, only 12.5% of the quarter blocks QB1-QB4 are exposed. Consequently, the line ML is depicted to have a halftone dot area rate of 25%, instead of 50%.

In order to cope with the above described problem, the preferred embodiment of the present invention modifies a number of pixels to be exposed (or a number of solid pixels) in each quarter block QB. In the preferred embodiment, the number $N_{BP}$ of solid pixels in each quarter blocks QB is determined by using the following equation (4):

$$PS_{av}/255 = N_{BP}/N_{TOT} \quad (4)$$

where $PS_{av}$ denotes an average value of the processed signal PS in the quarter block QB, which is found by averaging the value of the processed image signal having dynamic ranges 0 to 255 applied for each pixel. $N_{TOT}$ denotes the total number of pixels in the quarter block QB.

Figure 8:
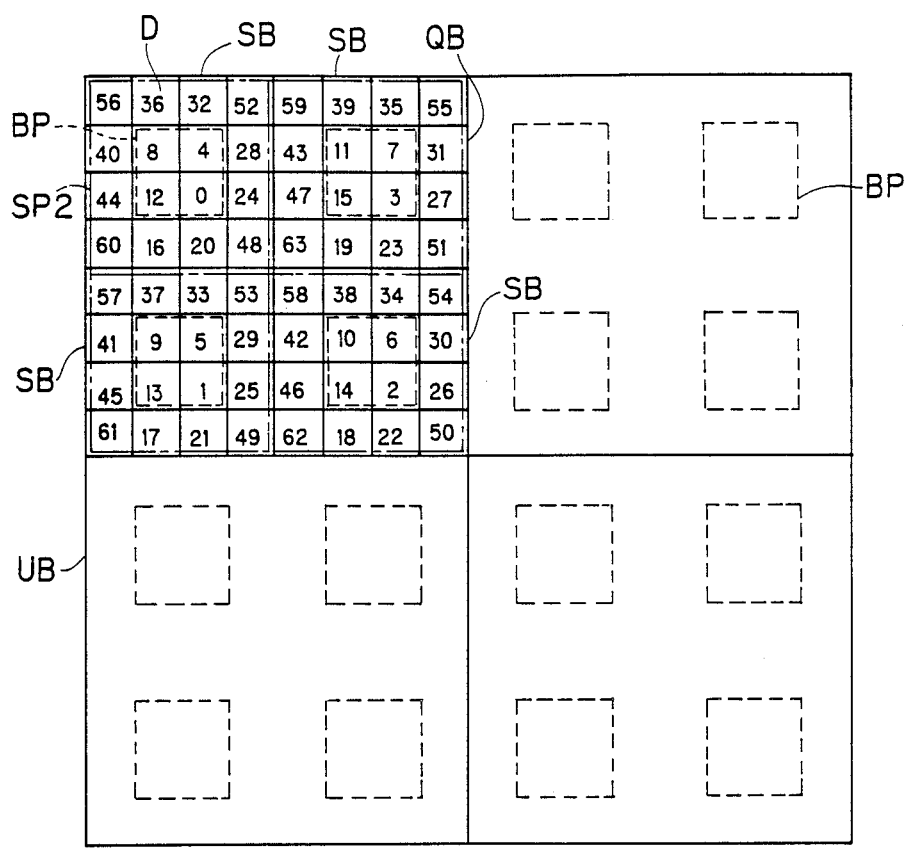
FIG. 8 is a diagram showing a screen threshold pattern having a short screen pitch.
Figure 9:
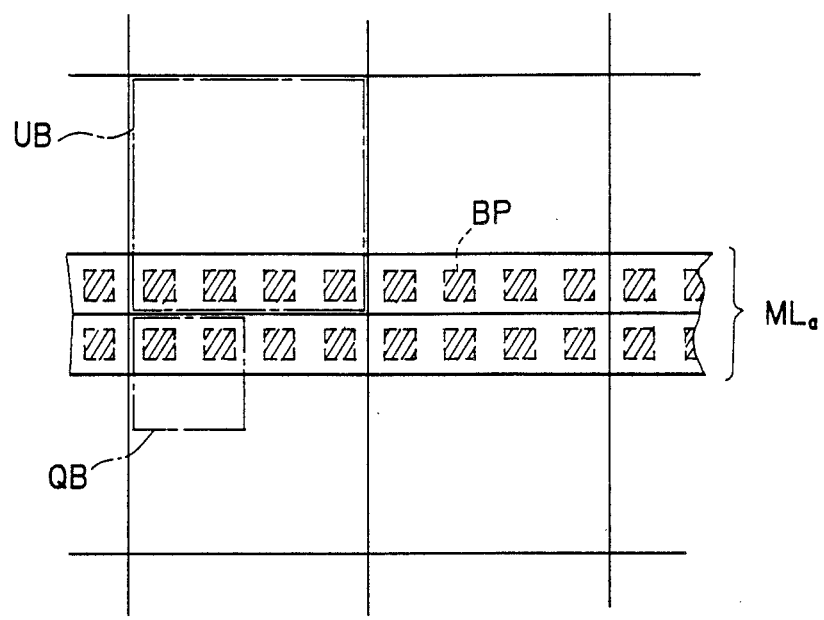
FIG. 9 is a diagram showing formation of a line on the screen threshold pattern having a short cycle.

In practice, instead of performing the above calculation according to the equation (4), the number $N_{BP}$ of solid pixels in each quarter block QB can be counted as follows: First, a virtual screen threshold pattern SP2 as shown in FIG. 8 is prepared. The unit block UB of the virtual screen threshold pattern SP2 are divided into four quarter blocks QB, and each quarter block QB is further divided into four subblocks SB. Screen threshold data D in each subblock SB are so arranged that they increase from the center to the periphery of the subblock SB. Further, all the subblocks SB have a similar arrangement of the screen threshold data D to each other. When a processed image signal SP representing a halftone dot area rate of 50% is given, each central area of the subblocks SB, whose outline is drawn with a broken line, is exposed. Each central area, or solid portion BP can be thought to be a kind of halftone dot; therefore, the virtual screen threshold pattern SP2 may be thought to have a shorter screen pitch than the screen threshold pattern SP1. Second, a number $N_{BP}$ of solid pixels in each quarter block QB is computed with the virtual screen threshold pattern SP2. FIG. 9 illustrates a virtual line $ML_a$ produced on the basis of the virtual screen threshold pattern SP2. The virtual line $ML_a$ is represented by solid portions BP in respective half areas of the quarter blocks QB on which the virtual line $ML_a$ is passing. Because the solid portions BP corresponding to the halftone dot area rate of 50% are uniformly arranged in the unit block UB as shown in FIG. 9, the halftone dot area rate of the virtual line $ML_a$ agrees with that of the processed image signsal PS for the line ML. That is, the halftone dot area rate of the virtual line $ML_a$ is 50%, and that of the quarter blocks QB is 25%. The number $N_{BP}$ of solid pixels in the solid portions BP in each quarter blocks QB can be easily counted according to the virtual line $ML_a$.

The number $N_{BP}$ of solid pixels thus obtained is stored as the number $N_{ST}$ of reference solid pixels for each quarter block QB.

At a step S13, the converted image signals $RS_{Fi}$ and $RS_{Gi}$ converted with the conversion functions $F_i$ and $G_i$, respectively, are obtained for each quarter block QB.

At a step S14, the numbers $N_{RS}$ of virtual solid pixels formed on the basis of respective converted image signals $RS_{Fi}$ and $RS_{Gi}$ and the screen threshold pattern SP1 are calculted for each quarter block QB.

At a step S15, the number $N_{ST}$ of reference solid pixels and each of the numbers $N_{RS}$ of virtual solid pixels based on respective converted image signals $RS_{Fi}$ and $RS_{Gi}$ are compared with each other for each quarter block QB, to find one of the numbers $N_{RS}$ of virtual solid pixels which is the closest to the number $N_{ST}$ of reference solid pixels.

At a step S16, one of the conversion functions corresponding to the number $N_{RS}$ of virtual solid pixels found in the above described step S15 is found among the conversion functions $F_i$ and $G_i$ and specified as a most-approximate conversion function for each quarter block QB.

Additionaly, at a step S17 in which actual exposure is performed, the processed image signal PS is converted using the most-approximate conversion function found at the step S16 for each quarter block QB, to expose the photosensitive film 600 in response to the converted image signal RS. Consequently, the error of a halftone dot area rate is decreased from that of the prior art.

Figure 10A:
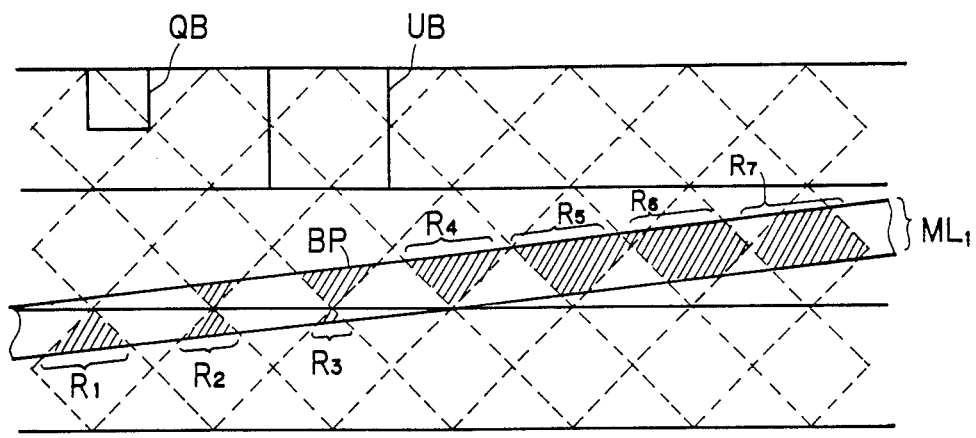
FIG. 10A is a diagram showing formation of a line without signal conversion.
Figure 10B:
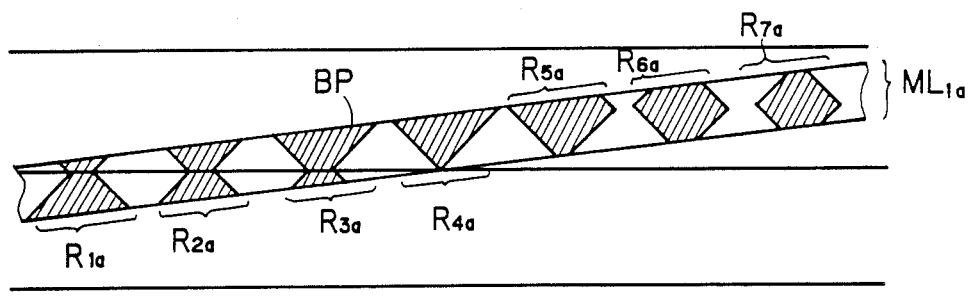
FIG. 10B is a diagram showing formation of a line after signal conversion.

FIG. 10A is a diagram showing an example of a line $ML_1$ having a halftone dot area rate of 50% formed without using the conversion functions. FIG. 10B is a diagram showing a line $ML_{1a}$ formed with using the conversion functions. Solid portions $R_{1-R7}$ and $R_{1a-R7a}$ in the lines $ML_1$ and $ML_{1a}$, respectively, are shaded. The sizes of the areas $R_1$-$R_7$ greatly differ form each other in FIG. 10a. On the other hand, the sizes of the areas $R_{1a}$-$R_{7a}$ are approximately equal to each other in FIG. 10B. The areas $R_1$-$R_3$ in FIG. 10A are too small to attain the halftone dot area rate of 50%. The areas $R_{1a}$-$R_{3a}$ in FIG. 10B become bigger than the areas $R_1$-$R_3$. On the other hand, the areas $R_5$-$R_7$ in FIG. 10A are too big. Therefore, the areas $R_{5a}$-$R_{7a}$ in FIG. 10B become smaller than the areas $R_5$-$R_7$. The areas $R_4$ and $R_{4a}$ are equal to each other because they represent the halftone dot area rate of 50%. In short, the areas $R_{1a}$-$R_{7a}$, which are formed while using the conversion functions, attain the halftone dot area rate of 50% which is represented by the processed image signal SP for the line $ML_1$ ($ML_{1a}$).

Figure 11:
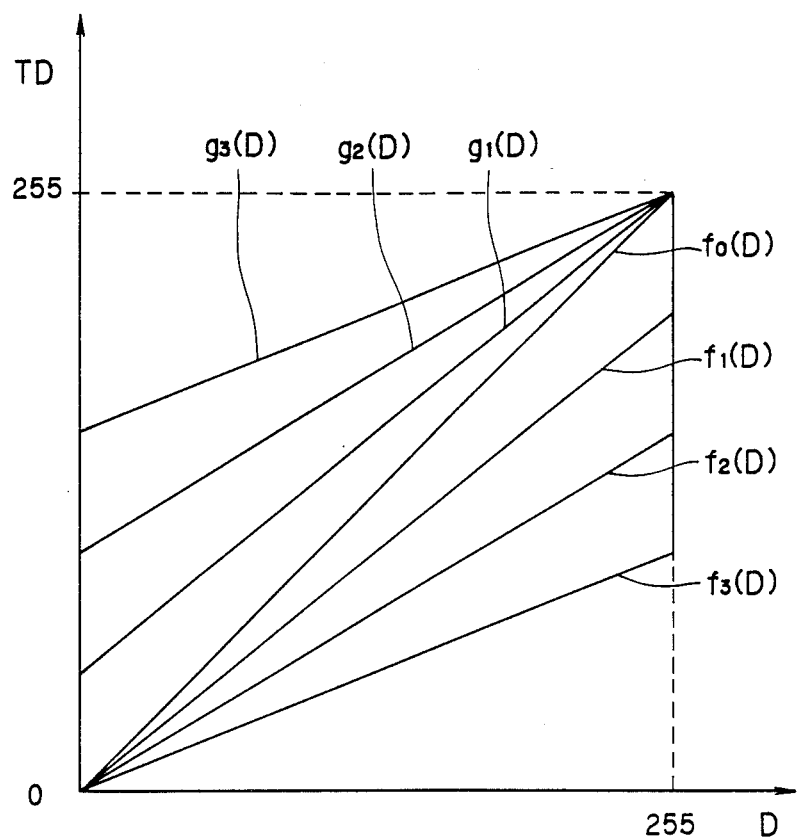
FIG. 11 is a graph showing conversion functions according to another preferred embodiment of the present invention.

The above described conversion can be performed with the conversion functions $f_i$ and $g_i$ (i=0 to 3) shown in FIG. 11. Those conversion functions $f_i$ and $g_i$ are applied to a screen threshold pattern in spite of the processed image signal PS. A screen threshold value D is converted into a converted screen threshold values TD using one of the conversion functions $f_i$ and $g_i$. The following conversion functions $f_i$ and $g_i$ are so determined as to decrease gradation levels of the screen threshold value D in order to maintain sharpness of an image:

$$TD=f_0(D)=k^0 \times D$$

$$TD=f_1(D)=k^1 \times D$$

$$TD=f_2(D)=k^2 \times D$$

$$TD=f_3(D)=k^3 \times D$$

$$TD=g_1(D)=k^1 \times (D-255)+255$$

$$TD=g_2(D)=k^2 \times (D-255)+255$$

$$TD=g_3(D)=k^3 \times (D-255)+255$$

The dynamic range of the screen threshold value D is assumed to be from 0 to 255. In addition, it is supposed that $0 < k < 1$. The other conditions are the same as those in the above described example of the conversion functions $F_i$ and $G_i$. The halftone dot area rate in an image is increased when the function $f_i$ is applied while it is decreased when the function $g_i$ is applied.

When the screen threshold value D is converted into the converted screen threshold value TD using each of the conversion functions $f_i$ and $g_i$, the number of solid pixels is corrected in the same manner as in the above described example with the conversion functions $F_i$ and $G_i$, whereby the solid portions are formed to attain a proper value of the halftone dot area rate.

In this embodiment, the numbers $N_{RS}$ of virtual solid pixels based on a plurality of conversion functions are calculated for each quarter block in response to the image signal PS. In order to perform this calculation, a value of the image signal PS is compared with the screen threshold data with respect to each pixel in each quarter block QB, whereby it is judged whether or not each pixel is exposed. Since each pixel in this quarter block is not actually exposed according to the result of the comparison, this processing will be referred to as virtual exposure processing in which a virtual beam is assumed to scan an image with respect to each pixel. The numbers $N_{RS}$ of virtual solid pixels for respective conversion functions are calculated in this virtual exposure for each quarter block QB. The numbers $N_{RS}$ are then stored in a memory in preparation for actual exposure.

The number $N_{ST}$ of reference solid pixels is also calculated for each quarter block QB by virtual exposure processing. The number $N_{ST}$ is then stored in the memory.

FIG. 3C shows an example of positions of a virtual beam $B_v$ and an actual beam $B_a$. The virtual beam $B_v$ precedes the actual exposure beam by a length $l_d$ of at least a diagonal of the quarter block QB in a subscanning direction X. Accordingly, for the quarter block QB on which the actual exposure beam $B_a$ is scanning, the number $N_{ST}$ of reference solid pixels and the numbers $N_{RS}$ of virtual solid pixels have been already calculated.

In the present embodiment, the virtual beam $B_v$ precedes the actual exposure beam $B_a$ by n pixels in the subscanning direction X. The value of n is selected to be the smallest integer satisfying the condition that a product of n and P is greater than the length of the diagonal of the quarter block QB, where P indicates the length of one side of the pixel PX shown in FIG. 3A.

The memory for storing the numbers $N_{ST}$ and $N_{RS}$ does not necessarily have the capacity to store all those numbers $N_{ST}$ and $N_{RS}$ for all the quarter blocks QB on the entire surface of the film 600. More specifically, when the angle $\theta$ of rotation between the two coordinates (see FIG. 3A) satisfies that $-45° \leq \theta < 45°$ or $135° \leq \theta < 225°$, the coordinate $QB_x$ of the quarter block (see FIG. 3C) may be converted as: $QB_{xa} = QB_x \cdot \mod 4$. As described before with FIG. 3C, the exposure beam moves in the main scanning direction Y, and the distance $l_d$ between the actual exposure beam $B_a$ and the virtual exposure beam $B_v$ is about the length of the diagonal of the quarter block in the subscanning direction X. Therefore, when the virtual exposure beam $B_v$ begins to scan a quarter block with coordinates $(QB_x, QB_y) = (4, 0)$, for example, the actual exposure beam $B_a$ will have finished to scan the quarter block with coordinates $(QB_x, QB_y) = (0, 0)$. This means that the memory for storing the numbers $N_{ST}$ and $N_{RS}$ may not keep the numbers $N_{ST}$ and $N_{RS}$ of the quarter block with coordinates $(0, 0)$ when the virtual exposure beam $B_v$ begins to scan the quarter block with coordinates $(4, 0)$. Consequently, by using the coordinates $(QB_{xa}, QB_y)$ instead of $(QB_x, QB_y)$, each quarter block QB can be identified in the memory. On the other hand, when the angle $\theta$ satisfies that $45° \leq \theta < 135°$ or $225° \leq \theta < 315°$, the coordinate $QB_y$ instead of $QB_x$ is converted as: $QB_{ya} = QB_y \cdot \mod 4$.

Such coordinate transformation can reduce memory capacity by a factor of four.

Meanwhile, the above described memory stores a flag of one bit for each quarter block, in addition to the numbers $N_{RS}$ and $N_{ST}$. The function of this flag is to indicate whether or not the numbers $N_{ST}$ and $N_{RS}$ are calculated in a quarter block under processing, and if not, the contents of the memory is cleared so that the memory can store the numbers $N_{RS}$ and $N_{ST}$ for the new quarter block.

Figure 12:
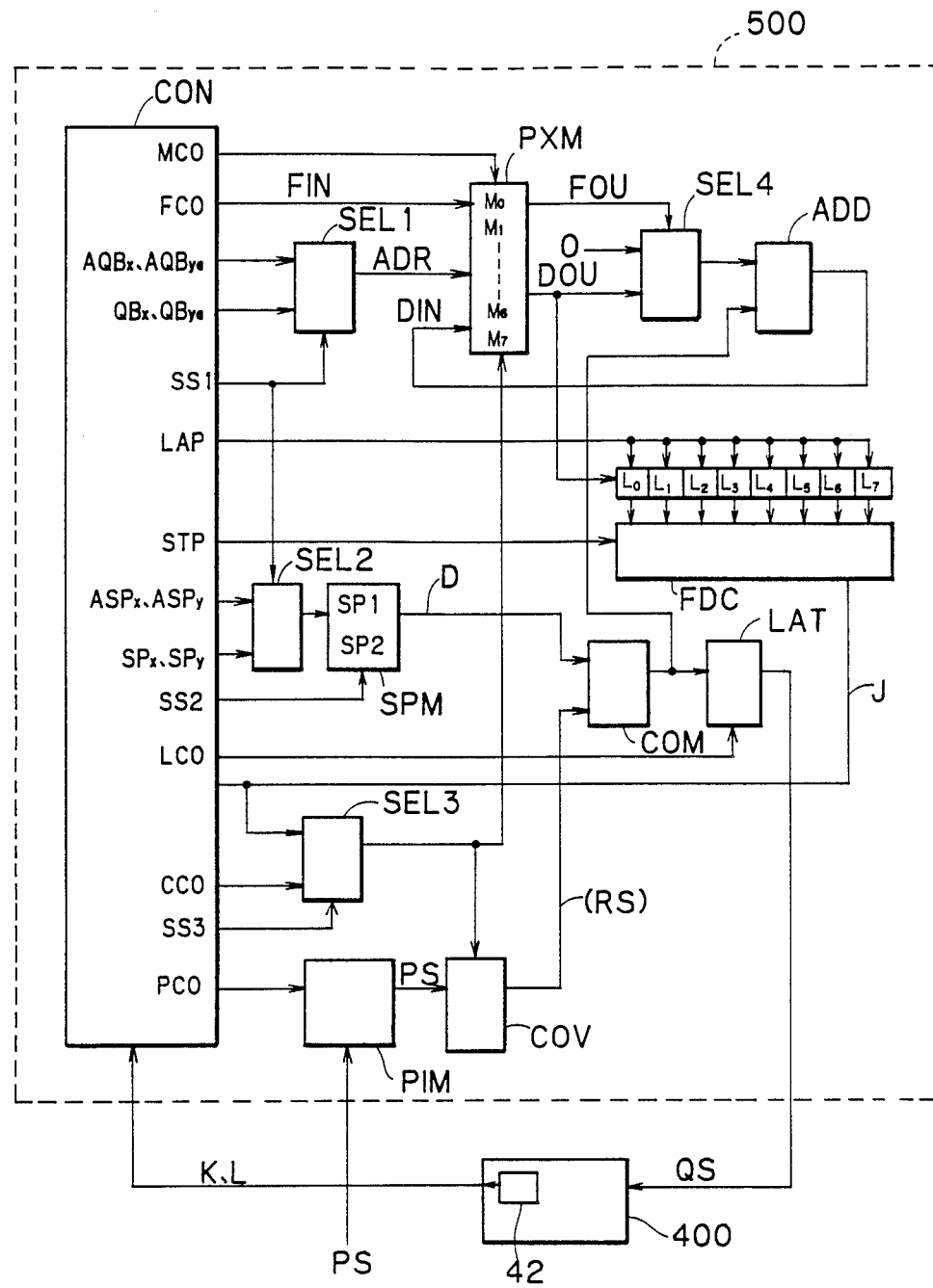
FIG. 12 is a circuit diagram showing an unit for generating a halftone dot signal according to a preferred embodiment of the present invention.

FIG. 12 is a block diagram showing the internal structure of the halftone-dot signal generator 500 according to an embodiment of the present invention, in which the image signal PS is subjected to the conversion.

The position signals K and L are respectively supplied from the rotary encoders 62 and 42 of the recording scanner unit 400 to a hardware controllor CON provided in the halftone-dot signal generator 500. The position signals K and L represent the film coordinates $(F_x, F_y)$ as described before. The hardware controller CON converts the position signals K and L into the quarter block coordinates $(QB_x, QB_{ya})$ and the screen pattern coordinates $(SP_x, SP_y)$ which are both used for the actual exposure. The hardware controller CON also generates quarter block coordinates $(AQB_x, AQB_{ya})$ and screen pattern coordinates $(ASP_x, ASP_y)$ which are used for the virtual exposure. Those coordinates for the virtual exposure are related to the film coordinates $(F_x, F_{(y+n)})$; this means that the virtual exposure beam $B_v$ precedes the actual exposure beam $B_a$ by n pixels in the subscanning direction Y, as described before.

A pixel memory PXM has memory elements $M_0$ to $M_6$ for respectively storing the numbers $N_{RS}$ of virtual solid pixels corresponding to the conversion functions $F_0$ to $F_3$ and $G_1$ to $G_3$ and the memory element $M_7$ for storing the number $N_{ST}$ of reference solid pixels. These memory elements $M_0$-$M_7$ store the numbers $N_{RS}$ and $N_{ST}$ for a plurality of quarter blocks.

In this pixel memory PXM, all flags for the memory elements $M_0$ to $M_7$ are set to zero in response to a memory control signal MCO prior to exposure processing.

The numbers $N_{RS}$ and $N_{ST}$ are counted and stored in the pixel memory PXM as follows:

First, the hardware controller supplies a first selection signal SS1 to a first selector SEL1. Two sets of coordinates $(AQB_x, AQB_{ya})$ and $(QB_x, QB_{ya})$ are also supplied to the first selector SE1, and it selects the former in response to the first selection signal SS1. The quarter block coordinates $(AQB_x, AQB_{ya})$ are supplied from the first selector SE1 to the pixel memory PXM as an address ADR. The pixel memory PXM outputs the content of the memory element $M_0$ in response to the quarter block coordinates $(AQB_x, AQB_{ya})$. The quarter block coordinates $(AQB_x, AQB_{ya})$ indicate the quarter block in which a pixel corresponding to the given image signal PS is located. When a first pixel of a quarter block is subjected to this processing, the flags for all the memory elements $M_0$-$M_7$ are initialized as described before. Therefore, the pixel memory PXM outputs a flag signal FOU having a value of "0". The output DOU of the pixel memory PXM (currently the content of the memory element $M_0$) is supplied to a fourth selector SEL4, which also receives a constant signal representing "0". The selector SEL4 selects the output DOU when the value of the flag signal FOU is "1", or the constant signal of "0" value when the value of the flag signal FOU is "0". Since the flag signal FOU has a value of "0" at the beginning, the constant signal of "0" value is selected and supplied to an adder ADD.

Simultaneously, the first selection signal SS1 is supplied from the hardware controller CON to a second selector SEL2. The second selector SEL2 are accepting two sets of screen pattern coordinates $(ASP_x, ASP_y)$ and ($SP_x$, $SP_y$), and selects the former in response to the first select signal SS1. The screen pattern coordinates ($ASP_x$, $ASP_y$) are supplied to a screen threshold memory SPM as an address.

This memory SPM stores the first threshold pattern SP1 having a normal screen pitch and the second threshold pattern SP2 having a shorter screen pitch. The first threshold pattern SP1 is first selected in response to a second select signal SS2 supplied from the hardware controller CON, whereby its threshold value D stored therein is outputted. Additionally, on this occasion, a third selector SEL3 selects a conversion control signal CCO supplied from the hardware controller CON in response to a third select signal SS3, to supply the same to the pixel memory PXM and a converter COV.

This converter COV first converts the image signal PS by the conversion function $F_0$ in response to the above described conversion control signal CCO, to output the same as the converted image signal RS. The image signal PS corresponding to either of the virtual exposure beam and the actual exposure beam is read out from an image memory PIM in response to an image memory control signal PCO which indicates the position of the pixel under processing. The converter COV can be constructed as a memory of look-up table type.

The converted image signal thus obtained and the screen threshold value D are supplied to a comparator COM to judge whether or not the pixel under processing is to be exposed. The comparator COM outputs "1" in the case of $RS \geq D$ while outputting "0" in the other cases, to supply the output to the adder ADD.

The output value "1" of the comparator means that the pixel under processing is to be exposed, or solid, and the value "0" means that the pixel is not to be exposed.

The adder ADD performs addition of the output of the comparator COM and the output of the selector SEL4. The result of the addition represents the number of solid pixels ever counted in the quarter block. The result of the addition is supplied from the adder ADD to the pixel memory PXM to replace the content of the memory element $M_0$ for the quarter block. That is, the number of solid pixels in each quarter block is accumulated by the adder ADD and stored in the pixel memory PXM. When the content of the memory element $M_0$ for the quarter block is replaced by the result of the addition, a flag controller FCO provided in the hardware controller CON supplies a flag signal FIN having a value of "1" to the pixel memory PXM, thereby setting the flag of the memory element $M_0$ for the quarter block at "1".

In the foregoing operation, updating of the memory element $M_0$ in the pixel memory PXM, that is, calculation of the number $N_{RS}$ of virtual solid pixels for the image signal PS converted by the conversion function $F_0$ are completed.

Through the same procedure as above, the memory areas $M_1$ to $M_6$ in the pixel memory PXM are respectively updated for the same image signal PS converted by the converison functions $F_1$ to $F_3$ and $G_1$ to $G_3$, respectively. Thus, the numbers $N_{RS}$ of virtual solid pixels are respectively calculated for the image signal PS converted by respective conversion functions.

When all the pixels in a quarter block are treated by the above processing, the steps S13 and S14 shown in FIG. 4A are completed for that quarter block.

Furthermore, updating of the memory area $M_7$, that is, calculation of the number $N_{ST}$ of reference solid pixels (at the step S12 shown in FIG. 4A) is achieved in a similar manner. In this case, the image signal PS is converted by the conversion function $F_0$, that is, it is not converted actually, and compared with the second threshold pattern SP2 having a shorter screen pitch stored in the screen threshold memory SPM.

The first selection signal SS1 is then switched. As a result, the first selector SEL1 selects the quarter block coordinates ($QB_x$, $QB_{ya}$) for actual exposure, to output the same as an address ADR to the pixel memory PXM.

The respective numbers $N_{RS}$ of virtual solid pixels stored in the memory areas $M_0$ to $M_6$ and the number $N_{ST}$ of reference solid pixels stored in the memory area $M_7$ are sequentially read out in response to this address ADR. The numbers $N_{RS}$ and $N_{ST}$ of solid pixels are stored in registers $L_0$ to $L_7$ in synchronism with a latch pulse LAP supplied from the hardware controller CON. On this occasion, each of the flags in the pixel memory PXM is initialized to zero.

When the registers $L_0$ to $L_7$ are filled with the data $N_{RS}$ and $N_{ST}$, a circuit FDC for determining an optimum conversion function operates in response to a starting pulse STP supplied form the hardware controller CON.

This circuit FDC calculates the difference between the number $N_{ST}$ of reference solid pixels and each of the numbers $N_{RS}$ of virtual solid pixels, i.e., $|L_7 - L_J|$ (where $J = 0, 1, \ldots, 6$) and finds one of the numbers $N_{RS}$ of virtual solid pixels which is the closest to the number $N_{ST}$ of reference solid pixels (at the step S15 shown in FIG. 4B), to supply a signal J indicative of the optimum conversion function to the third selector SEL3. On this occasion, the signal J is selected by the third selector SEL3 in stead of the conversion control signal CCO in response to switching of the third selection signal SS3, to be supplied to the converter COV. Consequently, one of the conversion functions $F_0$ to $F_3$ and $G_1$ to $G_3$ indicated by the signal J is selected (at the step S16 shown in FIG. 4B).

The image signal PS is converted by the selected conversion function $F_2$, for example. The converted image signal RS is inputted to the comparator COM.

At this time, the second selector SEL2 selects the screen pattern coordinates ($SP_x$, $SP_y$) for actual exposure, to output the same as an address. The screen threshold value D is read out from the first threshold pattern SP1 in response to the address, to be inputted to the comparator COM.

This comparator COM outputs "1" in the case of $RS \geq D$ while outputting "0" in the other cases.

The output of the comparator COM is latched in a latch circuit LAT in synchronism with a latch control signal LCO, to be sent to recording scanner unit 400 as the exposure control signal QS. Accordingly, the steps S11 to S17 shown in FIG. 4B are carried out.

The foregoing operation is repeated every time the film coordinates ($F_x$, $F_y$) of the exposure beam are updated, thereby producing a sharp halftone image.

Figure 13:
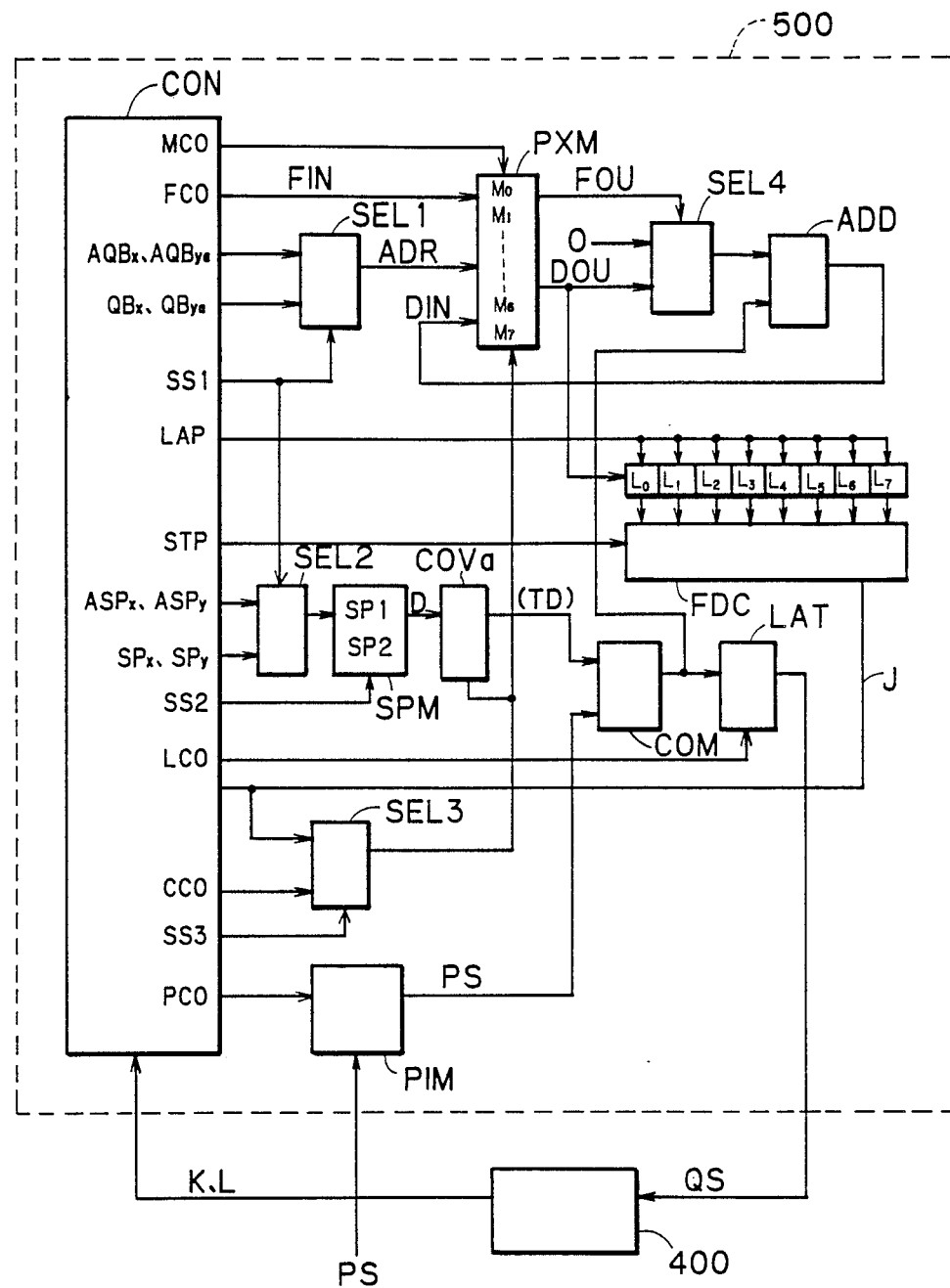
FIG. 13 is a circuit diagram showing an unit for generating a halftone dot signal according to another preferred embodiment of the present invention.

FIG. 13 is a block diagram showing the structure of a halftone-dot signal generator 500 according to another embodiment of the present invention, in which a screen threshold value D is converted. The structure and the operation in this case are almost the same as those in the above described case shown in FIG. 12 in which the image signal PS is converted. The processed image signal PS outputted from an image memory PIM is directly supplied to the comparator COM in the circuit shown in FIG. 13, and the screen threshold value D supplied from the screen memory SPM is converted into a converted screen threshold value TD by a converter $COV_a$ and supplied to the comparator COM. In this case, the functions $f_i$ and $g_i$ as shown in FIG. 11 have been stored in the converter $COV_a$.

Figure 14:
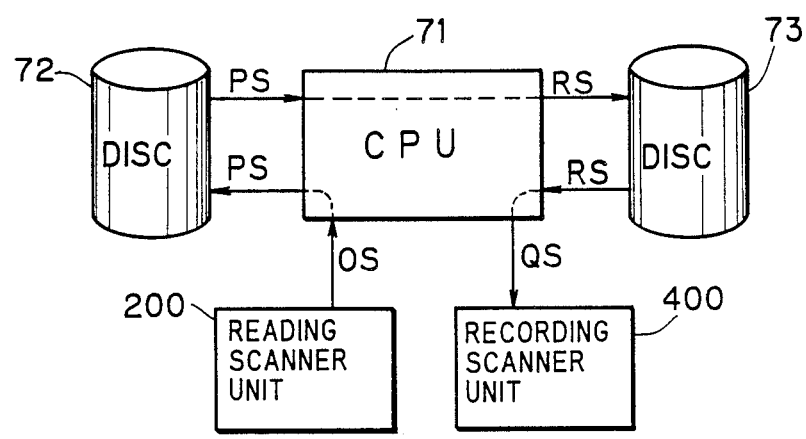
FIG. 14 is a diagram showing the structure of another apparatus to which the present invention is applied.

FIG. 14 is a diagram showing the structure of an image processing apparatus using another recording medium, according to still another embodiment of the present invention.

An image signal OS obtained by a reading scanner unit 200 is inputted to a CPU 71, to be converted into a processed image signal PS. This processed image signal PS is temporarily stored in a disc memory 72.

In performing conversion, the processed image signal PS is read out from the disc memory 72. The above described processing in the hardware circuit shown in FIG. 12 or FIG. 13 is performed in the CPU 71 according to a software program corresponding to the flow charts of FIGS. 4A and 4B. A converted image signal RS is supplied from CPU 71 to another disc memory 73 and stored therein. The converted image signal RS is read out from the disc memory 73 on demand. The image signal RS is converted into an exposure control signal QS in the CPU 71, to be supplied to a recording scanner unit 400. In this apparatus, the signal processing and the actual exposure can be separately performed.

The present invention can be applied to a method of preparing a lot of halftone-dot fonts having different sizes and shapes, storing the fonts in a screen font memory, and reading out the same as an exposure control signal in response to a given image signal.

According to the present invention, a contour and a line portion are formed to be seen continuously and without being broken in a reproduced halftone image with a simple apparatus and without causing graininess noise and moiré.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of producing a halftone image, comprising the steps of:
   (a) preparing image data representing an original image for each pixel,
   (b) preparing first screen pattern data specifying a set of first threshold values for said image data, said first threshold values being assigned to respective pixels in a unit pixel block of a prescribed size,
   (c) preparing a plurality of conversion functions usable to convert said image data to change gradation of said image data,
   (d) assigning unit pixel blocks over said original image, and dividing each of said unit pixel blocks into a plurality of partial blocks,
   (e) computing a reference number of reference solid pixels for each partial block, said reference solid pixels being to be solid in order to attain a halftone-dot area rate specified by said image data for each partial block,
   (f) converting said image data by said plurality of conversion functions to produce a plurality of virtual image data, respectively,
   (g) comparing each of said plurality of virtual image data with said first screen pattern data for each pixel in each partial block to judge whether or not each pixel is to be solid, thereby computing a virtual number of pixels to be solid for each partial block with respect to each of said plurality of virtual image data,
   (h) comparing said reference number with said virtual number corresponding to each of said plurality of virtual image data, thereby selecting one of said plurality of virtual image data whose virtual number is closest to said reference number, for each partial block,
   (i) selecting one of said plurality of conversion functions by which selected virtual image data are obtained, for each partial block,
   (j) converting said image data into converted image data by a selected conversion function with respect to each partial block, and
   (k) producing a halftone image as a function of said converted image data and said first screen pattern data.

2. A method in accordance with claim 1, wherein said reference number is so defined that a ratio of said reference number to a total number of pixels in one partial block is proportional to an average of said image data in a corresponding partial block.

3. A method in accordance with claim 2, wherein said step (e) comprises the steps of:
   (e-1) preparing second screen pattern data specifying a set of second threshold values for said image data in one partial block, said second threshold values being so formed that said partial block is divided into a plurality of subblocks in each of which said second threshold values are arranged from the center to the periphery in order,
   (e-2) comparing said image data with said second screen pattern data for each pixel in each partial block to judge whether or not each pixel is to be solid, and
   (e-3) defining said reference number to be the number of pixels judged to be solid in each partial block at said step (e-2).

4. A method in accordance with claim 3, wherein said plurality of conversion functions are linear functions having a variable corresponding to said image data, and a coefficient of said variable is no less than one.

5. A method of producing a halftone image, comprising the steps of:
   (a) preparing image data representing an original image for each pixel,
   (b) preparing first screen pattern data specifying a set of first threshold values for said image data, said first threshold values being assigned to respective pixels in a unit pixel block of a prescribed size,
   (c) preparing a plurality of conversion functions to convert said first screen pattern data usable to change gradation of said first threshold values,
   (d) assigning unit pixel blocks over said original image, and dividing each of said unit pixel blocks into a plurality of partial blocks,
   (e) computing a reference number of reference solid pixels for each partial block, said reference solid pixels being to be solid in order to attain a halftone-dot area rate specified by said image data for each partial block,
   (f) converting said first screen pattern data by said plurality of conversion functions to produce a plurality of virtual screen pattern data, respectively, (g) comparing said image data with each of said plurality of virtual screen pattern data for each pixel in each partial block to judge whether or not each pixel is to be solid, thereby computing a virtual number of pixels to be solid for each partial block with respect to each of said plurality of virtual screen pattern data, (h) comparing said reference number with said virtual number corresponding to each of said plurality of virtual screen pattern data, thereby selecting one of said plurality of virtual screen pattern data whose virtual number is closest to said reference number, for each partial block, (i) selecting one of said plurality of conversion functions by which selected virtual screen pattern data is obtained, for each partial block, (j) converting said first screen pattern data into converted screen pattern data by a selected conversion function with respect to each partial block, and (k) producing a halftone image as a function of said image data and said converted screen pattern data.

6. A method in accordance with claim 5, wherein
said reference number is so defined that a ratio of said reference number to a total number of pixels in one partial block is proportional to an average of said image data in a corresponding partial block.

7. A method in accordance with claim 6, wherein
said step (e) comprises the steps of:
(e-1) preparing second screen pattern data specifying a set of second threshold values for said image data in one partial block, said second threshold values being so formed that said partial block is divided into a plurality of subblocks in each of which said second threshold values are arranged from the center to the periphery in order, (e-2) comparing said image data with said second screen pattern data for each pixel in each partial block to judge whether or not each pixel is to be solid, and (e-3) defining said reference number to be the number of pixels judged to be solid in each partial block at said step (e-2).

8. A method in accordance with claim 7, wherein
said plurality of conversion functions are linear functions having a variable corresponding to said first screen pattern data, and a coefficient of said variable is no more than one.

9. An apparatus for producing a halftone image, comprising:
(a) first memory means for storing image data representing at least a part of an original image for each pixel, (b) second memory means for storing first screen pattern data specifying a set of first threshold values for said image data, said first threshold values being assigned to respective pixels in a unit pixel block of a prescribed size, (c) conversion means for converting said image data by a plurality of conversion functions usable to change gradation of said image data, thereby obtaining a plurality of virtual image data, (d) computing means for computing a reference number of reference solid pixels for each partial block, said partial block being a piece of divided areas of said unit pixel block, said reference solid pixels being to be solid in order to attain a halftone dot area rate specified by said image data for each partial block, (e) means for comparing each of said plurality of virtual image data with said first screen pattern data for each pixel in each partial block to judge whether or not each pixel is to be solid, thereby computing a virtual number of pixels to be solid for each partial block with respect to each of said plurality of virtual image data, (f) selecting means for comparing said reference number with said virtual number corresponding to each of said plurality of virtual image data, selecting one of said plurality of virtal image data whose virtual number is closest to said reference number for each partial block, and selecting one of said plurality of conversion functions for each partial block by which selected virtual image data is obtained, (g) means for indicating a selected conversion function for each partial block to said conversion means, and (h) means for producing a halftone image as a function of said first screen pattern data and converted image data converted by said selected conversion function in said conversion means.

10. An apparatus in accordance with claim 9, wherein
said reference number is so defined that a ratio of said reference number to a total number of pixels in one partial block is proportional to an average of said image data in a corresponding partial block.

11. An apparatus in accordance with claim 10, wherein
said computing means comprises:
(d-1) means for storing second screen pattern data specifying a set of second threshold values for said image data in one partial block, said second threshold values being so formed that said partial block is divided into a plurality of subblocks in which said second threshold values are arranged from the center to the periphery in order, and (d-2) means for comparing said image data with said second screen pattern data for each pixel in each partial block to judge whether or not each pixel is to be solid, and defining said reference number to be the number of pixels judged to be solid in each partial block.

12. An apparatus in accordance with claim 11, wherein
said plurality of conversion functions are linear functions having a variable corresponding to said image data, and a coefficient of said variable is no less than one.

13. An apparatus for producing a halftone image, comprising:
(a) first memory means for storing image data representing at least a part of an original image for each pixel, (b) second memory means for storing first screen pattern data specifying a set of first threshold values for said image data, said first threshold values being assigned to respective pixels in a unit pixel block of a prescribed size, (c) conversion means for converting said first screen pattern data by a plurality of conversion functions usable to change gradation of said threshold values, thereby obtaining a plurality of virtual screen pattern data, (d) computing means for computing a reference number of reference solid pixels for each partial block, said each partial block being a piece of divided areas of said unit pixel block, said reference solid pixels being to be solid in order to attain a halftone dot area rate specified by said image data for each pixel block, (e) means for comparing said image data with each of said plurality of virtual screen pattern data for each pixel in each partial block to judge whether or not each pixel is to be solid, thereby computing a virtual number of pixels to be solid for each partial block with respect to each of said plurality of virtual screen pattern data, (f) means for comparing said reference number with each virtual number corresponding to each of said plurality of virtual screen pattern data, selecting one of said plurality of virtual screen pattern data whose virtual number is closest to said reference number for each partial block, and selecting one of said plurality of conversion functions for each partial block by which selected virtual screen pattern data is obtained, (g) means for indicating a selected conversion function for each partial block to said conversion means, and (h) means for producing a halftone image as a function of said image data and converted screen pattern data converted by said selected conversion function in said conversion means.

14. An apparatus in accordance with claim 13, wherein
said reference number is so defined that a ratio of said reference number to a total number of pixels in one partial block is proportional to an average of said image data in a corresponding partial block.

15. An apparatus in accordance with claim 14, wherein
said computing means comprises:
(d-1) means for storing second screen pattern data specifying a set of second threshold values for said image data in one partial block, said second threshold values being so formed that said partial block is divided into a plurality of subblocks in which said second threshold values are arranged from the center to the periphery in increasing order, and
(d-2) means for comparing said image data with said second screen pattern data for each pixel in each partial block to judge whether or not each pixel is to be solid, and defining said reference number to be the number of pixel judged to be solid in each partial block.

16. An apparatus in accordance with claim 15, wherein
said plurality of conversion functions are linear functions having a variable corresponding to said first screen pattern data, and a coefficient of said variable is no more than one.

* * * * *